(12) United States Patent
Doppke et al.

(10) Patent No.: US 11,881,068 B1
(45) Date of Patent: Jan. 23, 2024

(54) SYSTEMS AND METHODS FOR LOCKING EXPOSURE SETTINGS OF EQUIPMENT

(71) Applicant: GM GLOBAL TECHNOLOGY OPERATIONS LLC, Detroit, MI (US)

(72) Inventors: Gregory R Doppke, Ira Township, MI (US); Noel J Miller, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/152,849

(22) Filed: Jan. 11, 2023

(51) Int. Cl.
  *G07C 9/10* (2020.01)
  *G07C 9/00* (2020.01)
  *B25J 9/16* (2006.01)

(52) U.S. Cl.
  CPC ............. *G07C 9/10* (2020.01); *B25J 9/1661* (2013.01); *G07C 9/00182* (2013.01)

(58) Field of Classification Search
  CPC ....... G07C 9/10; G07C 9/00182; B25J 9/1661
  USPC .......................................................... 235/93
  See application file for complete search history.

(56) References Cited

U.S. PATENT DOCUMENTS

| | | | |
|---|---|---|---|
| 2018/0179733 A1* | 6/2018 | Pitts | E02F 9/2025 |
| 2019/0010910 A1* | 1/2019 | Arnot | B60W 30/18018 |
| 2020/0072123 A1* | 3/2020 | Bruce | F02M 31/125 |
| 2020/0101982 A1* | 4/2020 | Bowers | B60W 50/14 |

* cited by examiner

*Primary Examiner* — Daniel A Hess
(74) *Attorney, Agent, or Firm* — Lorenz & Kopf LLP (57) ABSTRACT

Systems and methods are provided for locking equipment exposure settings. The system includes a safety interlock device coupled to an access point of a barrier and equipment enclosed thereby. The safety interlock device is configured to suspend a normal operation of the equipment while in an open state and allow the normal operation while in a closed state. The system includes an access point control device configured to allow a user to select among exposure settings for the equipment corresponding to operability of the equipment, and to, by a processor: control the equipment to operate in accordance with a selected exposure setting, determine whether the safety interlock device is in the open or closed state, automatically lock the selected exposure setting if the safety interlock device is in the open state, and automatically unlock the selected exposure setting if the safety interlock device is in the closed state.

20 Claims, 5 Drawing Sheets

SYSTEMS AND METHODS FOR LOCKING EXPOSURE SETTINGS OF EQUIPMENT

INTRODUCTION

The technical field generally relates to industrial equipment safety, and more particularly relates to systems and methods that are capable of logically securing an access point control device based on operation of a safety interlock device.

Industrial equipment is commonly located behind a barrier such as a wall or a fence to protect machine operators, maintenance, and other personnel from hazards. Such barriers typically include a locked access point such as a gate or door. A locking and/or latching mechanism associated with the access point may be functionally coupled with a safety interlock device. Safety interlock devices (a.k.a., gate interlocks, safety interlock switches, interlock devices, etc.) provide a dependency between the latching/locking mechanism at the access point and the industrial equipment secured within the barrier. In general, the access point must be closed and/or locked for the industrial equipment to operate. For example, power to the industrial equipment may be interrupted while the access point is open and/or unlocked. Safety interlock devices with a locking function may also prevent the access point from being opened while the industrial equipment is in operation.

In some industrial environments, it may be desirable to provide one or more partial levels of operation of the industrial equipment prior to entering the access point. While completely disabling the industrial equipment may provide the highest level of safety, partial operation may be desirable for certain tasks that the user intends to perform.

Accordingly, it is desirable to provide systems and/or methods that allow for multiple levels of operation of industrial equipment while simultaneously providing safety precautions that reduce the likelihood of injury to personnel accessing the industrial equipment. Furthermore, other desirable features and characteristics of the present invention will become apparent from the subsequent detailed description and the appended claims, taken in conjunction with the accompanying drawings and the foregoing technical field and background.

SUMMARY

A system is provided to reduce the likelihood that a level of operation of equipment may be changed while an individual is exposed to potential hazards associated with the equipment. In one embodiment, the system includes a safety interlock device functionally coupled to an access point of a barrier and equipment enclosed by the barrier and accessible via the access point. The safety interlock device is configured to automatically suspend a normal operation of the equipment while in an open state and automatically allow the normal operation of the equipment while in a closed state. The system includes an access point control device that includes a human-to-machine interface configured to allow a user to input a selection from among at least two exposure settings for the equipment, wherein each of the at least two exposure settings relate to a corresponding level of operability of the equipment and at least one of the at least two exposure settings correspond to a partial operation of the equipment, and a controller configured to, by a processor: control the equipment to operate in accordance with a selected exposure setting input by the user, determine whether the safety interlock device is in the open state or the closed state, automatically lock the selected exposure setting in response to determining that the safety interlock device is in the open state such that the selected exposure setting cannot be changed, and automatically unlock the selected exposure setting in response to determining that the safety interlock device is in the closed state such that the selected exposure setting can be changed.

In various embodiments, the system may include an indicator configured to indicate which of the at least two exposure settings is selected in response to input of the selection by the user.

In various embodiments, the system may include an indicator configured to indicate whether the selected exposure setting is locked.

In various embodiments, the controller may be configured to, by the processor, automatically reset the selected exposure setting in response to determining that the safety interlock device is in the closed state such that the equipment operates in accordance with a default exposure setting and/or the normal operation thereof, wherein unlocking the selected exposure setting includes unselecting the selected exposure setting.

In various embodiments, the safety interlock device may be configured to: automatically disable an automatic mode of the equipment in response to transitioning to the open state, wherein the equipment performs automated functions while in the automatic mode, and automatically enable the automatic mode of the equipment in response to transitioning to the closed state.

In various embodiments, the safety interlock device may be lockable while in the open state, wherein while locked the safety interlock device cannot transition to the closed state.

In various embodiments, the system may include a data storage device configured to store data indicating valid and invalid combinations of the at least two exposure settings, wherein the controller is configured to, by the processor, prevent the selection of the invalid combinations of the at least two exposure settings.

In various embodiments, the barrier may be a fence and the access point may be a gate or the barrier may be a wall and the access point may be a door.

In various embodiments, the safety interlock device and the access point control device may be functionally coupled to each other. In such embodiments, the safety interlock device may be configured to transmit data indicating whether the safety interlock device is in the open state or the closed state, and the access point control device may be configured to receive the data and use the data to determine whether the safety interlock device is in the open state or the closed state.

In various embodiments, at least one or the at least two exposure settings may correspond to a partial operation of the equipment necessary to perform a task related to training, teaching, and/or programming a robotic device of the equipment.

A method is provided for reducing the likelihood that a level of operation of equipment may be changed while an individual is exposed to potential hazards associated with the equipment. In one embodiment, the method includes selecting a first of at least two exposure settings for an equipment, wherein each of the at least two exposure settings relate to a corresponding level of operability of the equipment and at least one of the at least two exposure settings corresponds to a partial operation of the equipment, wherein the equipment is enclosed by a barrier and accessible via an access point of the barrier, transitioning a safety interlock device coupled to the access point into an open state, wherein the safety interlock device is configured to automatically suspend a normal operation of the equipment while in the open state, automatically locking, via a processor, the first exposure setting in response to determining that the safety interlock device is in the open state such that the first exposure setting cannot be changed, accessing the equipment through the access point, transitioning the safety interlock device to a closed state, wherein the safety interlock device is configured to automatically allow the normal operation of the equipment while in the closed state, and automatically unlocking, by the processor, the first exposure setting in response to determining that the safety interlock device is in the closed state.

In various embodiments, the method may include, in response to selecting the first exposure setting, indicating the first exposure setting as being selected.

In various embodiments, the method may include, in response to automatically locking the first exposure setting, indicating the first exposure setting as locked.

In various embodiments, the method may include automatically resetting, by the processor, the selected exposure setting in response to transitioning the safety interlock device to the closed state such that the equipment operates in accordance with a default exposure setting and/or normal operation thereof, wherein resetting the selected exposure setting includes unselecting the first exposure setting.

In various embodiments, the method may include automatically disabling an automatic mode of the equipment in response to transitioning the safety interlock device to the open state, wherein the equipment performs automated functions while in the automatic mode, and automatically enabling the automatic mode of the equipment in response to transitioning the safety interlock device to the closed state.

In various embodiments, the method may include locking the safety interlock device after transitioning the safety interlock device into the open state such that the safety interlock device cannot transition into the closed state, and unlocking the safety interlock device after accessing the equipment via the access point such that the safety interlock device can be transitioned to the open state.

In various embodiments, the method may include storing, in a data storage device, data indicating valid and invalid combinations of the at least two exposure settings, and preventing, by the processor, selection of the invalid combinations of the at least two exposure settings.

In various embodiments, the barrier is a fence and the access point is a gate or the barrier is a wall and the access point is a door.

In various embodiments, the method may include transmitting, with the safety interlock device, data indicating whether the safety interlock device is in the open state or the closed state, receiving, with the access point control device, the data from the safety interlock device, and using the data to determine whether the safety interlock device is in the open state or the closed state.

In various embodiments, the first exposure setting may correspond to a partial operation of the equipment necessary to perform a task related to training, teaching, and/or programming a robotic device of the equipment, and the method may include performing the task related to training, teaching, and/or programming the robotic device of the equipment while accessing the equipment through the access point.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
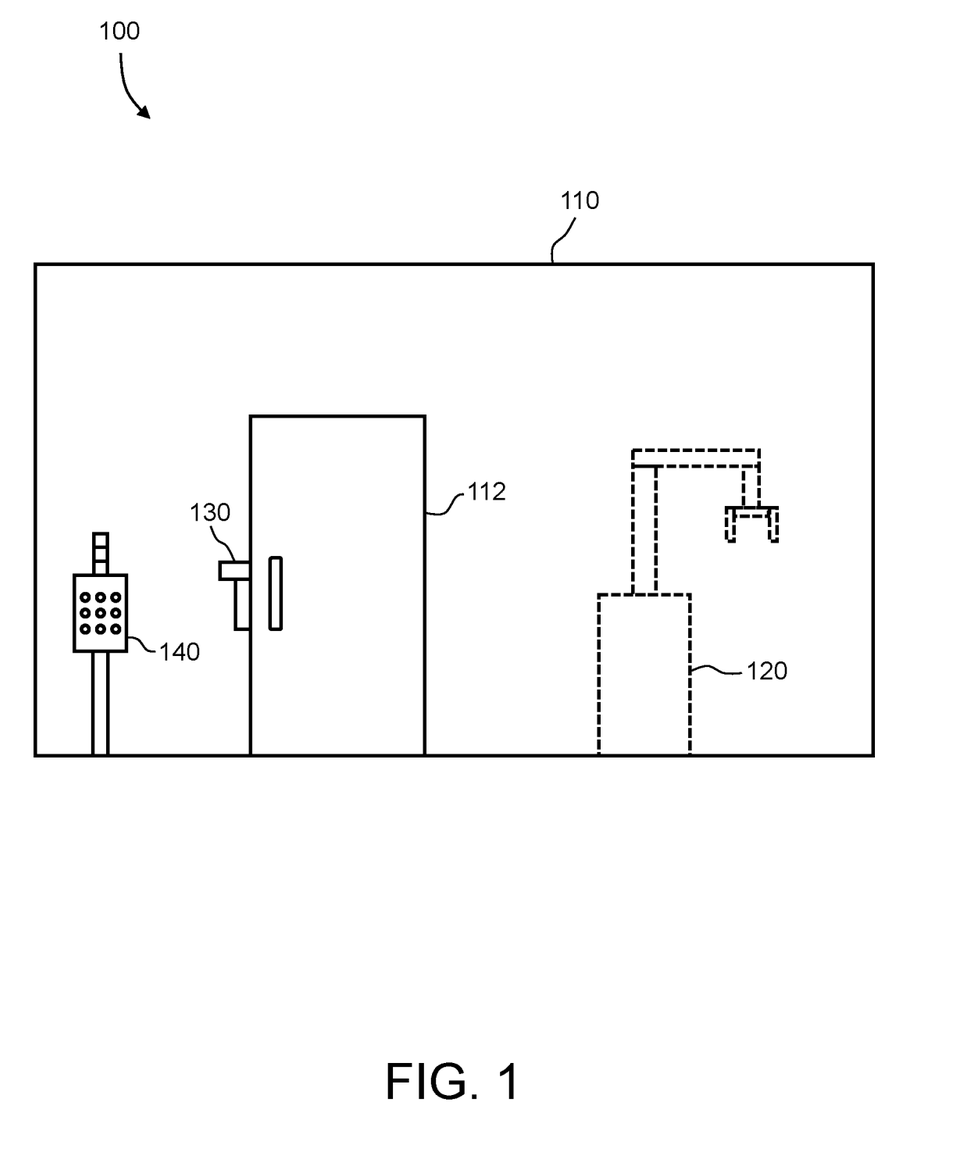
FIG. 1 is diagram representing an industrial environment that includes a safety system in accordance with an embodiment.

Referring to FIG. 1, an exemplary industrial environment 100 is represented that includes a piece of equipment 120 that is enclosed by a barrier 110, such as a fence or wall, in order to reduce the likelihood that personnel may be injured by the equipment 120 during operation thereof. The equipment 120 may be any type of equipment such as but not limited to various industrial or manufacturing equipment. In various embodiments, the equipment 120 may be configured to automatically perform functions based on preprogramed instructions. In certain embodiments, the equipment 120 may be a multi-axis, robotic device. An access point 112 is provided to allow personnel to access the equipment 120, such as to perform maintenance, repairs, and other tasks. In various embodiments, the access point 112 may be a gate, door, or the like.

Figure 2:
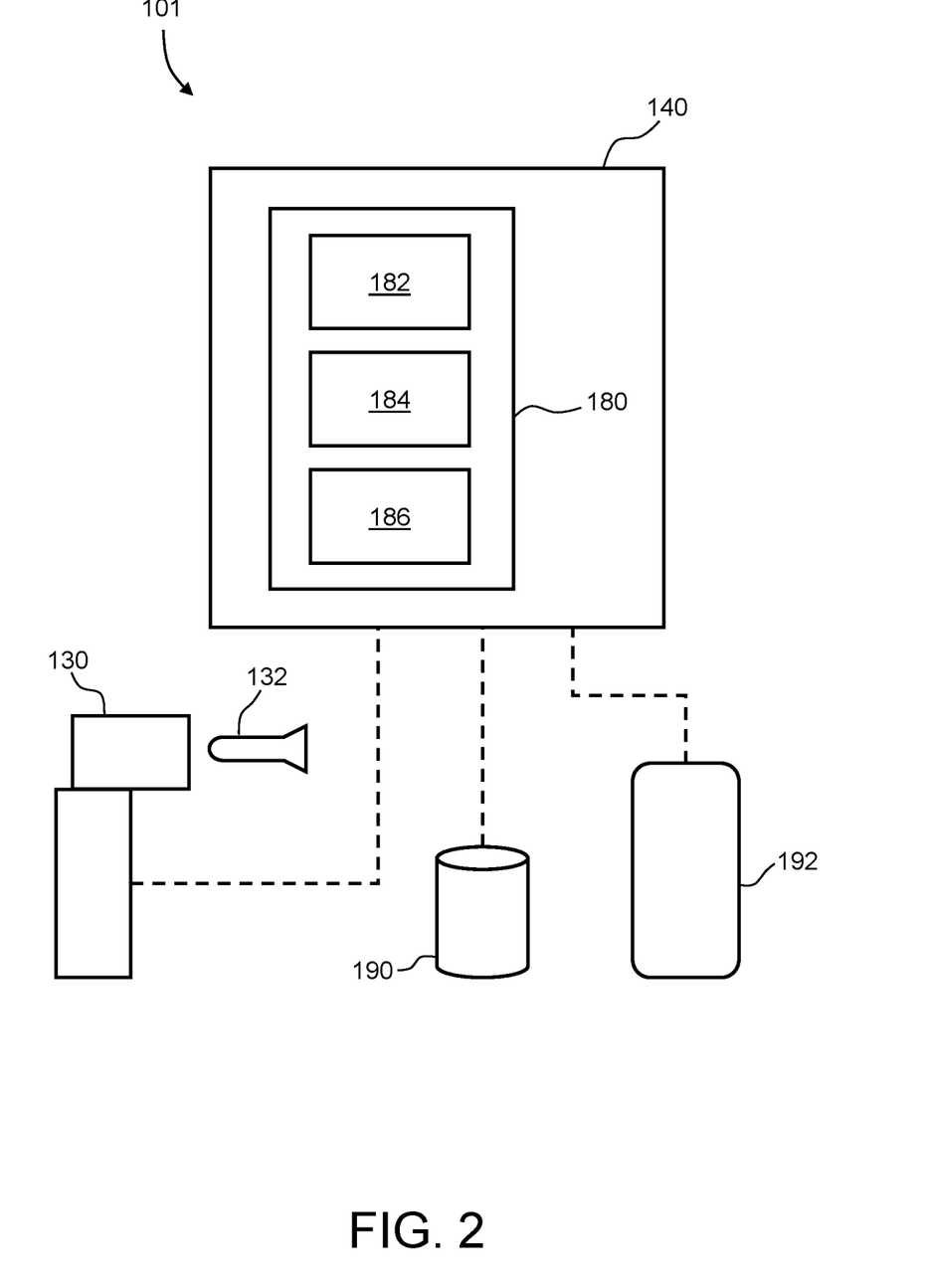
FIG. 2 is a diagram representing the safety system of FIG. 1 in accordance with an embodiment.

A safety system 101 is presented in FIG. 2 that provides dependencies between the access point 112 and the equipment 120 to provide additional layers of protection to the personnel. The system 101 includes a safety interlock device 130 and an access point control device 140.

The safety interlock device 130 is functionally coupled to the access point 112 of the barrier 110, for example, by a locking or latching mechanism thereof, by a magnetic or infrared sensor, or by various other devices. The safety interlock device 130 is also functionally coupled to the equipment 120, for example by a safety circuit thereof. Various types of safety interlock devices are commercially available and the system 101 is not limited to any particular type. Nonlimiting examples of the safety interlock device 130 include various safety interlock devices commercially available from Fortress Interlocks, a subsidiary of Halma PLC. In general, the safety interlock device 130 may be manually transitioned between a closed state and an open state (described below). The safety interlock device 130 may be regulated by various government regulations and/or industry standards such as, but not limited to, International Organization for Standardization standards ISO 14119 and ISO 13849.

In certain embodiments, the safety interlock device 130 may include a removable pin or key 132. While the key 132 is inserted into a corresponding port of the safety interlock device 130, the safety interlock device 130 is in the closed state. While in the closed state, the safety interlock device 130 does not interfere with the operation of the equipment 120. That is, the equipment 120 may function normally while the key 132 is inserted into the safety interlock device 130. Removal of the key 132 from the port of the safety interlock device 130 transitions the safety interlock device 130 into the open state. While in the open state, the safety interlock device 130 is configured to automatically suspend normal operation of the equipment 120. For example, removal of the key 132 may interrupt a supply of electrical power to the equipment 120, logically disable a normal operating mode (e.g., automatic mode) of the equipment 120, initiate shut down procedures of the equipment 120, or perform any other task that interferes with the normal operation of the equipment 120. In some embodiments, the key 132 may be configured to complete an electrical circuit while inserted into the safety interlock device 130 (i.e., closed state) and removal of the key 132 may open the electrical circuit (i.e., open state) thereby having an immediate effect on the equipment 120. Typically, workplace safety protocols require that the safety interlock device 130 is in the open state prior to personnel opening the access point 112 and entering an area enclosed by the barrier 110 containing the equipment 120. In some embodiments, the safety interlock device 130 locks the access point 112 while in the closed state such that the access to the equipment 120 is prevented, and unlocks the access point 112 while in the open state.

In some embodiments, the safety interlock device 130 may be lockable. For example, the safety interlock device 130 may have a metal plate or other structure configured to cover the port thereof while the safety interlock device 130 is in the open state, and the metal plate may be configured to be manually locked, such as with a security lock (e.g., padlock). With this arrangement, personnel intending to access the equipment 120 can lock the safety interlock device 130 in the open state and thereby ensure that the normal operation of the equipment 120 is not restored prior to the personnel exiting the barrier 110.

The access point control device 140 is configured to control certain aspects relating to the operability of the equipment 120. The access point control device 140 may include various components configured to perform the functions described herein, and is not limited to any particular configuration. In various embodiments, the access point control device 140 includes a controller 180 having at least one processor 182, a computer readable storage device, media, or memory 184, and a communication bus 186.

The processor 182 performs the computation and control functions of the controller 180. The processor 182 can be any custom made or commercially available processor, a central processing unit (CPU), a graphics processing unit (GPU), an auxiliary processor among several processors associated with the controller 180, a semiconductor-based microprocessor (in the form of a microchip or chip set), a macroprocessor, any combination thereof, or generally any device for executing instructions.

The memory 184 may include volatile and nonvolatile storage in read-only memory (ROM), random-access memory (RAM), and keep-alive memory (KAM), for example. KAM is a persistent or non-volatile memory that may be used to store various operating variables while the processor 182 is powered down. The memory 184 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 180 in controlling the equipment 120. The bus 186 serves to transmit programs, data, status and other information or signals between the various components of the access point control device 140.

The bus 186 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 182, may receive and process signals from the sensors, perform logic, calculations, methods and/or algorithms, and/or generate data based on the logic, calculations, methods, and/or algorithms.

As can be appreciated, the controller 180 may otherwise differ from the embodiment depicted in FIG. 2. For example, the controller 180 may be coupled to or may otherwise utilize one or more remote computer systems and/or other control systems, for example as part of one or more of the above-identified devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 182) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 180 may also otherwise differ from the embodiment depicted in FIG. 2, for example in that the computer system of the controller 180 may be coupled to or may otherwise utilize one or more remote computer systems and/or other control systems.

The system 101 may include a data storage device 190 configured to store data for use in controlling the equipment 120 and/or systems and components thereof. As can be appreciated, the data storage device 190 may be part of the controller 180, separate from the controller 180, or part of the controller 180 and part of a separate system. The storage device 190 can be any suitable type of storage apparatus, including various different types of direct access storage and/or other memory devices. In one exemplary embodiment, the storage device 190 comprises a program product from which a computer readable memory device can receive a program that executes one or more embodiments of one or more processes of the present disclosure, such as the steps of the process discussed further below in connection with FIG. 5. In another exemplary embodiment, the program product may be directly stored in and/or otherwise accessed by the memory device and/or one or more other disks and/or other memory devices.

In various embodiments, the system 101 may include a pendant device 192 configured to be releasably coupled with the access point control device 140 and thereby provide access to the functions thereof by a user.

Figure 3:
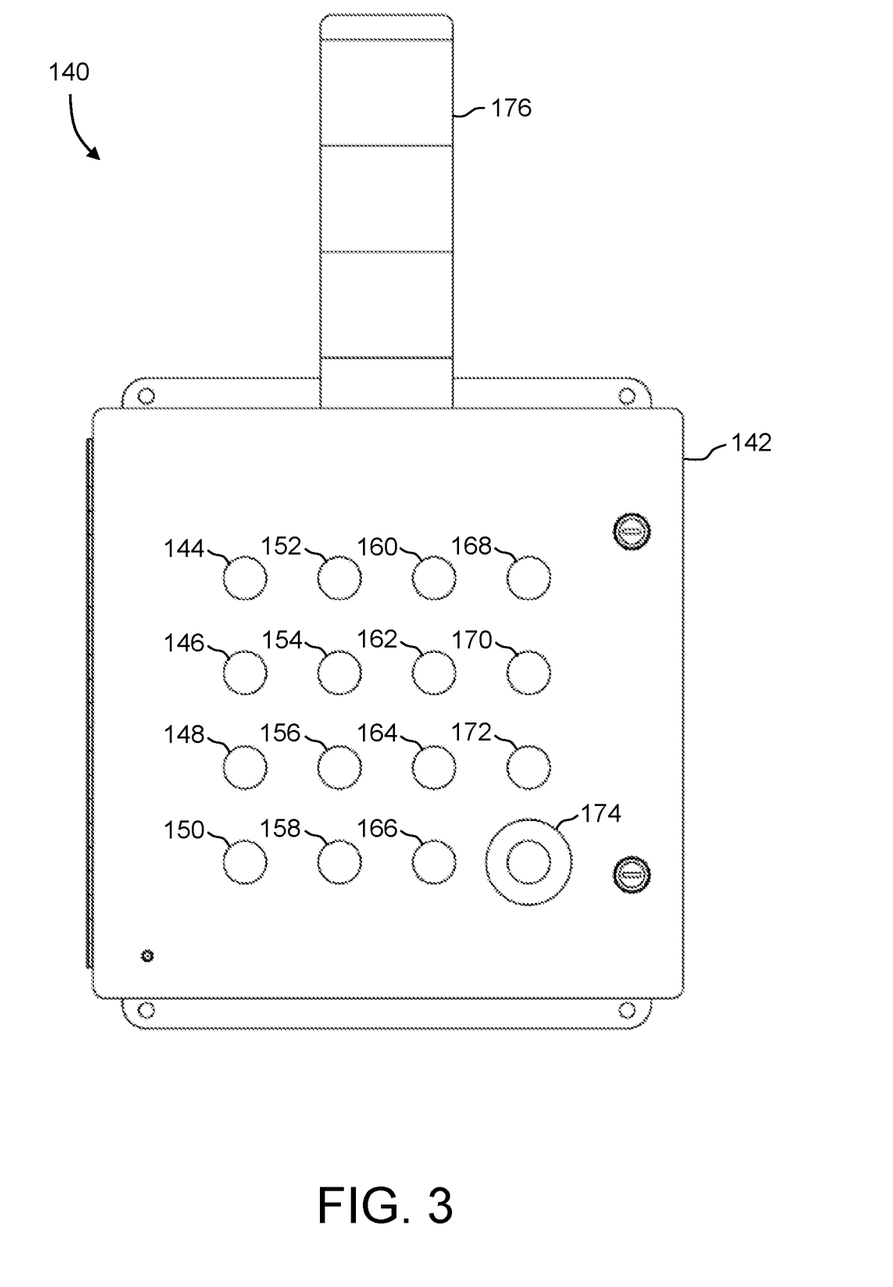
FIG. 3 is diagram representing an access point control device of the safety system of FIGS. 1 and 2 in accordance with an embodiment.

In the embodiment of FIG. 3, the access point control device 140 includes a housing 142 configured to store the controller 180 and various other components of the access point control device 140, a human-to-machine interface (HMI) configured to allow the user to input a selection from among multiple options, such as modes of operation of the equipment 120, and an indicator 176. The HMI includes an array of pushbuttons 144-174 that may individually be programed to control a corresponding function of the equipment 120. However, the HMI is not limited to pushbuttons and may include other types of HMI components such as switches, knobs, or touchscreens.

The pushbuttons 144-174 may be programmed to control various functions of the equipment 120. Such functions may include, but are not limited to, an emergency stop function (e.g., immediately cease operation of the equipment 120), a reset function (e.g., set the operation of the equipment 120 to default settings), a resume automatic function (e.g., resume normal operation of the equipment 120), various exposure selection functions (e.g., levels of operability of the equipment 120), and the like. The various exposure settings allow the user to choose a desired level of operation of the equipment 120 prior to entering the access point 112. For example, the user may be able to choose between exposure settings including no operation (e.g., power cut off from the equipment 120), partial operation (e.g., power provided to certain components of the equipment 120), or full operation of the equipment 120 (e.g., power provided to an entirety of the equipment 120). In various embodiments, the exposure settings may include multiple different partial operation options. For example, the exposure settings may include an option corresponding to a minimal level of operation of the equipment 120 necessary for tasks related to, for example, calibrating, replacing and/or performing maintenance on a specific component or tool of the equipment 120. As another example, the exposure settings may include an option corresponding to a minimal level of operation of the equipment 120 necessary for tasks related to, for example, training, teaching, or programming a robotic device of the equipment 120. As such, the access point control device 140 provides for the user the ability to select the desired exposure setting(s). The access point control device 140 is configured to then control the equipment 120 to operate in accordance with the selected exposure setting input by the user.

In various embodiments, the system 101 provides further safety to personnel by providing dependencies between the safety interlock device 130 and the access point control device 140. In particular, the system 101 is configured such that one or more controls, functions, or settings of the access point control device 140 are logically locked or disabled while the safety interlock device 130 is in the open state. In such embodiments, the safety interlock device 130 and the access point control device 140 may be directly coupled to each other by, for example, an electrical cable, a data cable, or a wireless connection, or may be functionally, but not directly, coupled to each other, for example, through a network or other intermediate device.

In various embodiments, the access point control device 140 is configured to, by the processor 182, determine whether the safety interlock device 130 is in the open state or the closed state, automatically lock the selected exposure setting (or a default exposure setting if an exposure setting has not been selected) in response to determining that safety interlock device 130 is in the open state such that the selected exposure setting cannot be changed, and automatically unlock the selected exposure setting in response to determining that the safety interlock device 130 is in the closed state. In some embodiments, the access point control device 140 may lock the selected exposure setting by disabling any of the pushbuttons 144-174, such as those associated with exposure setting selection, and unlock the selected exposure setting by enabling the pushbuttons 144-174, such as those associated with exposure setting selection. With this arrangement, the safety interlock device 130 is designated as a single point of safety control for both the equipment 120 and the access point control device 140. In various embodiments, the controller 180 is configured to, by the processor 182, automatically reset the exposure setting such that the selected exposure setting is unselected in response to determining that the safety interlock device 130 is in the closed state. In various embodiments, resetting the exposure setting may cause the equipment 120 to operate in accordance with a default exposure setting or the normal operation thereof (e.g., automatic mode).

The access point control device 140 may include one or more indicators, such as the indicator 176, configured to visually communicate (e.g., with one or more colored lights) a status of the access point control device 140, and therefore a status of the equipment 120. For example, the indicators may be configured to indicate which of the exposure settings is selected in response to input of the selection by the user, and whether such selection is locked due to the safety interlock device 130 being in the open state. In certain embodiments, the indicators may include, but are not limited to, pilot lights of the pushbuttons 144-174, lights (e.g., light emitting diodes) adjacent to the pushbuttons 144-174, or the like.

In various embodiments, the data storage device 190 may be configured to store data indicating valid and invalid combinations of the multiple exposure settings, wherein the controller 180 is configured to, by the processor 182, prevent selection of the invalid combinations of the exposure settings by a user interacting with the HMI. The invalid combinations may be preprogramed based on, for example, safety protocols, specific functions/structure of the equipment 120, and/or user preferences.

The access point control device 140 may be regulated by various government regulations and/or industry standards such as, but not limited to, International Organization for Standardization standard ISO13849-1 and International Electrotechnical Commission standard IEC 62061.

Figure 4:
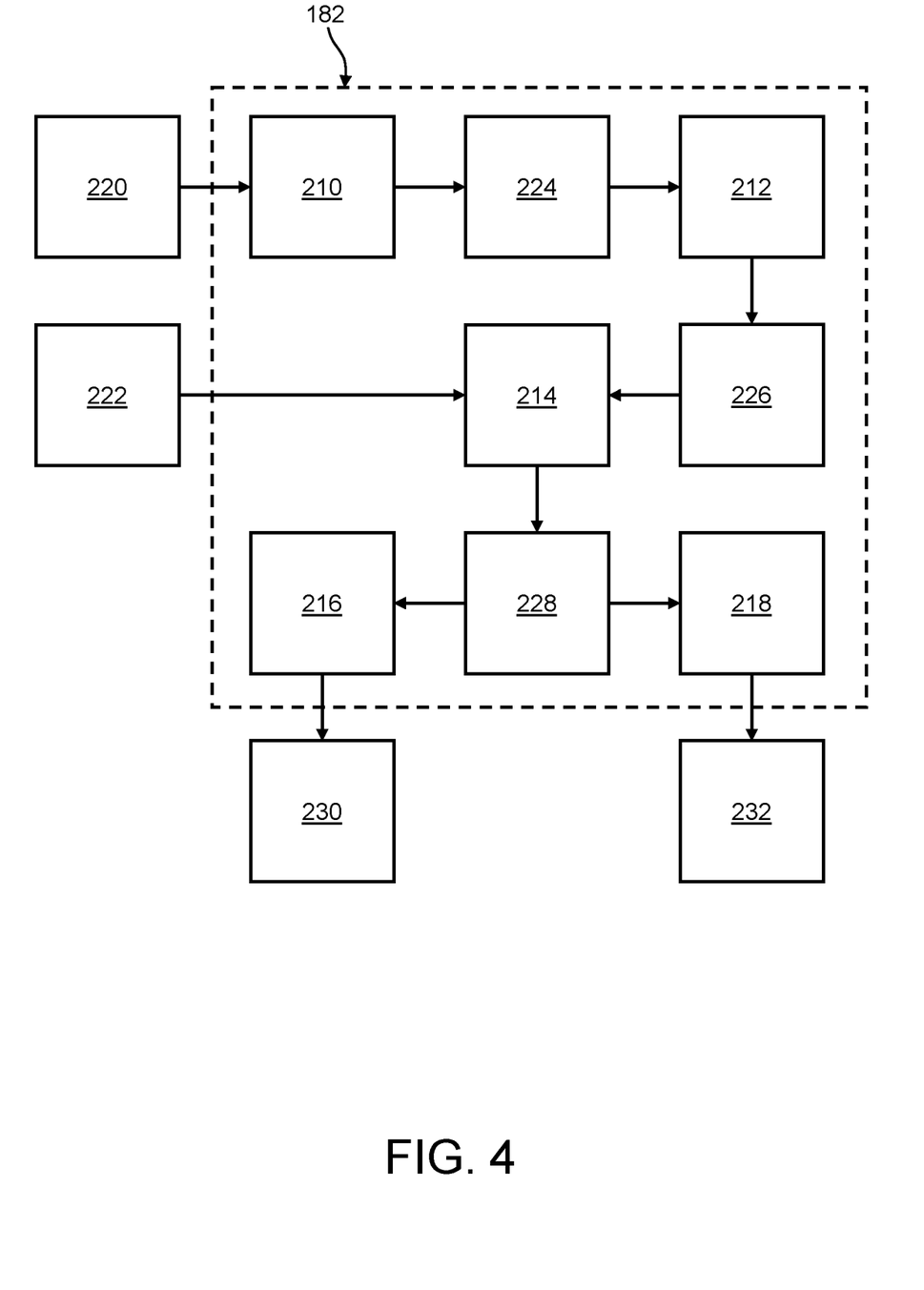
FIG. 4 is a dataflow diagram representing operation of the access point control device of FIG. 3 in accordance with an embodiment.

Referring now to FIG. 4, a dataflow diagram is presented that illustrates an exemplary operation of the controller 140 of the system 101 relating to the dependency to the safety interlock device 130 in accordance with various embodiments. As can be appreciated, various embodiments of the system 101 according to the present disclosure may include any number of modules embedded within the processor 182 which may be combined and/or further partitioned to similarly implement systems and methods described herein. Furthermore, inputs to the system 101 may be received from other control modules (not shown) associated with the system 101, and/or determined/modeled by other sub-modules (not shown) within the processor 182. Furthermore, the inputs might also be subjected to preprocessing, such as sub-sampling, noise-reduction, normalization, feature-extraction, missing data reduction, and the like. In various embodiments, the processor 182 includes a state analysis module 210, a selection lock module 212 a selection module 214, an equipment control module 216, and a selection indicator module 218.

In various embodiments, the state analysis module 210 receives as input state data 220 generated by the safety interlock device 130. The state data 220 includes various data related to a status of the safety interlock device 130. The state analysis module 210 performs an analysis of the state data 220 to determine whether the safety interlock device 130 is in the closed state or the open state and generates state analysis data 224 that includes various data indicating the results of such determination.

In various embodiments, the selection lock module 212 receives as input the state analysis data 224 generated by the state analysis module 210. The selection lock module 212 determines whether to logically lock the exposure settings of the access point control device 140 based on the determination indicated by the state analysis data 224. For example, the selection lock module 212 may decide to lock the exposure settings upon a determination that the safety interlock device 130 is in the open state, and may decide to unlock the exposure setting upon a determination that the safety interlock device 130 is in the closed state. The selection lock module 212 generates selection lock data 226 that includes various data indicating whether to lock or unlock the exposure settings.

In various embodiments, the selection module 214 receives as input user input data 222 generated by user interaction with the HMI (e.g., the pushbuttons 144-174) and the selection lock data 226 generated by the selection lock module 212. The user input data 222 includes various data indicating a selection by the user of at least one of the exposure settings. If the settings are unlocked, the selection module 214 accepts and initiates the selected exposure settings. If the exposure settings are locked, the selection module 214 rejects the selected exposure setting and maintains the current exposure settings. When the selection module 214 accepts the selected exposure settings, the selection module 214 generates selection data 228 that includes various data indicating the user selected exposure settings.

In various embodiments, the equipment control module 216 receives as input the selection data 228 generated by the selection module 214. The equipment control module 216 generates and transmits equipment control data 230 that includes various data configured to cause the equipment 120 to operate in accordance with the selected exposure setting.

In various embodiments, the selection indicator module 218 receives as input the selection data 228. The selection indicator module 218 generates and transmits selection indicator data 232 configured to cause one or more indicators of the access point control device 140, such as the indicator 176 to indicate which of the exposure settings are active/selected and, optionally, whether such exposure settings are locked.

Figure 5:
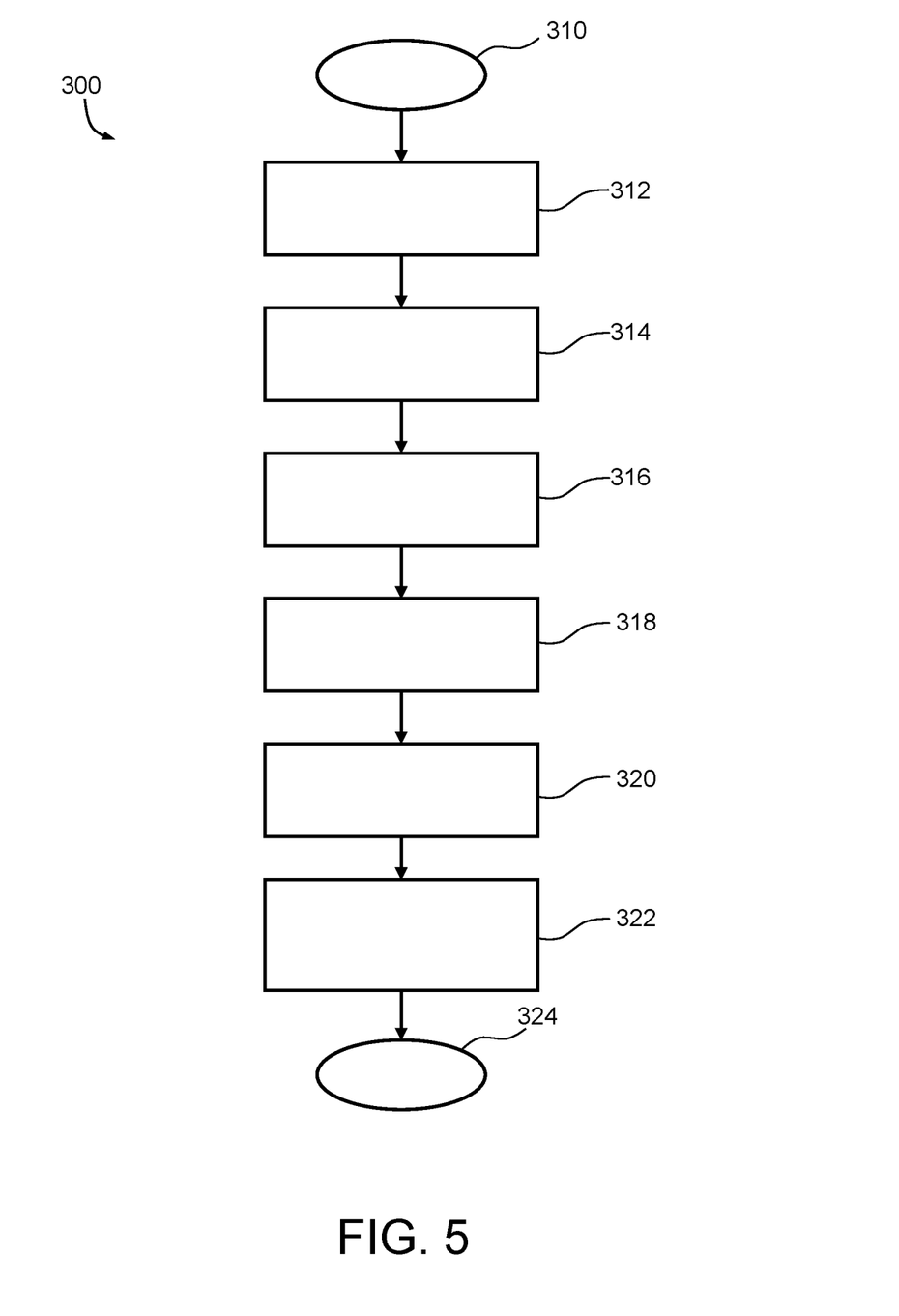
FIG. 5 is a method for operating the safety system of FIGS. 1 and 2 in accordance with an embodiment.

With reference now to FIG. 5, a flowchart provides a method 300 for logically securing the access point control device 140 based on operation of the safety interlock device 130 as performed by the system 101, in accordance with exemplary embodiments. As can be appreciated in light of the disclosure, the order of operation within the method 300 is not limited to the sequential execution as illustrated in FIG. 5, but may be performed in one or more varying orders as applicable and in accordance with the present disclosure. In various embodiments, the method 300 can be scheduled to run based on one or more predetermined events, and/or can run continuously during operation of the system 101.

In one example, the method 300 may start at 310 and may include selecting an exposure setting at 312, for example, by pressing one or more of the pushbuttons 144-176 of the access point control device 140. At 314, the method 300 may include transitioning the safety interlock device 130 to the open state, for example, by removing the key 132. Optionally, the safety interlock device 130 may be manually locked. At 316, the method 300 may include automatically locking the exposure settings of the access point control device 140 such that the current exposure setting(s) are secured and unchangeable. At 318, the method 300 may include entering the area enclosed by the barrier 110 through the access point 112, accessing the equipment 120 to, for example, perform various tasks associated therewith, and then exiting the area enclosed by the barrier 110.

After exiting the area enclosed by the barrier 110, the method 300 may include transitioning the safety interlock device 130 to the closed position, for example, by re-inserting the key 132 into the port of the safety interlock device 130. If previously locked, the method 300 may include unlocking the safety interlock device 130 prior to inserting the key 132. At 322, the method 300 may include automatically logically unlocking the exposure settings of the access point control device 140 such that the exposure setting may be changed. In some embodiments, the method 300 may include automatically resetting the exposure setting to a default setting. The method 300 may end at 324.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system comprising:
    a safety interlock device functionally coupled to an access point of a barrier and equipment enclosed by the barrier and accessible via the access point, wherein the safety interlock device is configured to automatically suspend a normal operation of the equipment while in an open state and automatically allow the normal operation of the equipment while in a closed state;
    an access point control device comprising:
    a human-to-machine interface configured to allow a user to input a selection from among at least two exposure settings for the equipment, wherein each of the at least two exposure settings relate to a corresponding level of operability of the equipment and at least one of the at least two exposure settings corresponds to a partial operation of the equipment; and
    a controller configured to, by a processor:
    control the equipment to operate in accordance with a selected exposure setting input by the user;
    determine whether the safety interlock device is in the open state or the closed state;
    automatically lock the selected exposure setting in response to determining that the safety interlock device is in the open state such that the selected exposure setting cannot be changed; and
    automatically unlock the selected exposure setting in response to determining that the safety interlock device is in the closed state such that the selected exposure setting can be changed.

2. The system of claim 1, further comprising an indicator configured to indicate which of the at least two exposure settings is selected in response to input of the selection by the user.

3. The system of claim 1, further comprising an indicator configured to indicate whether the selected exposure setting is locked.

4. The system of claim 1, wherein the controller is configured to, by the processor, automatically reset the selected exposure setting in response to determining that the safety interlock device is in the closed state such that the equipment operates in accordance with a default exposure setting and/or the normal operation thereof, wherein unlocking the selected exposure setting includes unselecting the selected exposure setting.

5. The system of claim 1, wherein the safety interlock device is configured to:
    automatically disable an automatic mode of the equipment in response to transitioning to the open state, wherein the equipment performs automated functions while in the automatic mode; and
    automatically enable the automatic mode of the equipment in response to transitioning to the closed state.

6. The system of claim 1, wherein the safety interlock device is manually lockable while in the open state, wherein while locked the safety interlock device cannot transition to the closed state.

7. The system of claim 1, further comprising a data storage device configured to store data indicating valid and invalid combinations of the at least two exposure settings, wherein the controller is configured to, by the processor, prevent the selection of the invalid combinations of the at least two exposure settings.

8. The system of claim 1, wherein the barrier is a fence and the access point is a gate or the barrier is a wall and the access point is a door.

9. The system of claim 1, wherein the safety interlock device and the access point control device are functionally coupled to each other, the safety interlock device is configured to transmit data indicating whether the safety interlock device is in the open state or the closed state, and the access point control device is configured to receive the data and use the data to determine whether the safety interlock device is in the open state or the closed state.

10. The system of claim 1, wherein at least one or the at least two exposure settings corresponds to a partial operation of the equipment necessary to perform a task related to training, teaching, and/or programming a robotic device of the equipment.

11. A method comprising:
    selecting a first of at least two exposure settings for an equipment, wherein each of the at least two exposure settings relate to a corresponding level of operability of the equipment, wherein at least one of the at least two exposure settings corresponds to a partial operation of the equipment, wherein the equipment is enclosed by a barrier and accessible via an access point of the barrier;
    transitioning a safety interlock device coupled to the access point into an open state, wherein the safety interlock device is configured to automatically suspend a normal operation of the equipment while in the open state;
    automatically locking, via a processor, the first exposure setting in response to determining that the safety interlock device is in the open state such that the first exposure setting cannot be changed;
    accessing the equipment through the access point;
    transitioning the safety interlock device to a closed state, wherein the safety interlock device is configured to automatically allow the normal operation of the equipment while in the closed state; and
    automatically unlocking, by the processor, the first exposure setting in response to determining that the safety interlock device is in the closed state.

12. The method of claim 11, further comprising, in response to selecting the first exposure setting, indicating the first exposure setting as being selected.

13. The method of claim 11, further comprising, in response to automatically locking the first exposure setting, indicating the first exposure setting as locked.

14. The method of claim 11, further comprising, automatically resetting, by the processor, the selected exposure setting in response to transitioning the safety interlock device to the closed state such that the equipment operates in accordance with a default exposure setting and/or normal operation thereof, wherein resetting the selected exposure setting includes unselecting the first exposure setting.

15. The method of claim 11, further comprising:
    automatically disabling an automatic mode of the equipment in response to transitioning the safety interlock device to the open state, wherein the equipment performs automated functions while in the automatic mode; and
    automatically enabling the automatic mode of the equipment in response to transitioning the safety interlock device to the closed state.

16. The method of claim 11, further comprising:
   locking the safety interlock device after transitioning the safety interlock device into the open state such that the safety interlock device cannot transition into the closed state; and
   unlocking the safety interlock device after accessing the equipment via the access point such that the safety interlock device can be transitioned to the open state.

17. The method of claim 11, further comprising:
   storing, in a data storage device, data indicating valid and invalid combinations of the at least two exposure settings; and
   preventing, by the processor, selection of the invalid combinations of the at least two exposure settings.

18. The method of claim 11, wherein the barrier is a fence and the access point is a gate or the barrier is a wall and the access point is a door.

19. The method of claim 11, further comprising:
   transmitting, with the safety interlock device, data indicating whether the safety interlock device is in the open state or the closed state;
   receiving, with the access point control device, the data from the safety interlock device; and
   using the data to determine whether the safety interlock device is in the open state or the closed state.

20. The method of claim 11, wherein the first exposure setting corresponds to a partial operation of the equipment necessary to perform a task related to training, teaching, and/or programming a robotic device of the equipment, and the method comprising performing the task related to training, teaching, and/or programming the robotic device of the equipment while accessing the equipment through the access point.

* * * * *